(12) United States Patent
Feaviour

(10) Patent No.: US 8,173,572 B2
(45) Date of Patent: May 8, 2012

(54) METAL OXIDE SOLS

(75) Inventor: Mark Robert Feaviour, Reading (GB)

(73) Assignee: Johnson Matthey PLC, London (GB)

( * ) Notice: Subject to any disclaimer, the term of this patent is extended or adjusted under 35 U.S.C. 154(b) by 1188 days.

(21) Appl. No.: 11/630,467

(22) PCT Filed: Jun. 17, 2005

(86) PCT No.: PCT/GB2005/002382
§ 371 (c)(1),
(2), (4) Date: Dec. 5, 2007

(87) PCT Pub. No.: WO2005/123594
PCT Pub. Date: Dec. 29, 2005

(65) Prior Publication Data
US 2011/0160050 A1    Jun. 30, 2011

(30) Foreign Application Priority Data

Jun. 21, 2004 (GB) .................................. 0413767.5

(51) Int. Cl.
*B01J 23/00* (2006.01)
*B01J 21/00* (2006.01)
*B01J 20/00* (2006.01)
*B01J 29/00* (2006.01)
*B01J 37/00* (2006.01)

(52) U.S. Cl. ........ 502/304; 502/324; 502/325; 502/326; 502/327; 502/328; 502/332; 502/333; 502/334; 502/335; 502/336; 502/337; 502/338; 502/339; 502/349; 502/350; 502/351; 502/355; 502/415; 502/439

(58) Field of Classification Search .................. 502/304, 502/324, 325, 326, 327, 328, 332–339, 349, 502/350, 351, 355, 415, 439
See application file for complete search history.

(56) References Cited

U.S. PATENT DOCUMENTS

| 5,227,356 | A | 7/1993 | Hess et al. | |
|---|---|---|---|---|
| 5,286,700 | A | 2/1994 | Terui et al. | |
| 5,976,476 | A | 11/1999 | Blanchard et al. | |
| 6,129,898 | A | 10/2000 | Watkins et al. | |
| 6,139,813 | A | 10/2000 | Narula et al. | |
| 6,291,392 | B2 | 9/2001 | Hesse et al. | |
| 6,592,842 | B2 * | 7/2003 | Elder et al. | 423/610 |
| 6,716,525 | B1 * | 4/2004 | Yadav et al. | 428/402 |
| 6,838,486 | B2 * | 1/2005 | Ryang | 516/90 |
| 6,986,818 | B2 * | 1/2006 | Tillotson et al. | 149/19.92 |
| 7,081,433 | B2 * | 7/2006 | Rolison et al. | 502/344 |
| 7,125,536 | B2 * | 10/2006 | Fu et al. | 423/592.1 |
| 7,393,518 | B2 * | 7/2008 | Chiang et al. | 423/608 |
| 2002/0128152 | A1 | 9/2002 | Hesse et al. | |
| 2003/0012942 | A1 * | 1/2003 | Larsen et al. | 428/304.4 |
| 2005/0123465 | A1 * | 6/2005 | Chane-Ching | 423/349 |

FOREIGN PATENT DOCUMENTS

| DE | 101 32 441 A1 | 1/2003 |
|---|---|---|
| EP | 1 522 341 A1 | 4/2005 |
| GB | 1 494 484 | 12/1977 |
| JP | 5-38451 | 2/1993 |
| JP | 5-329366 | 12/1993 |
| KR | 2002092067 | 12/2002 |
| KR | 2003043536 | 6/2003 |
| WO | WO-00/27527 | 5/2000 |
| WO | WO-00/47319 A1 | 8/2000 |
| WO | WO-01/51202 A1 | 7/2001 |

* cited by examiner

*Primary Examiner* — Cam N. Nguyen
(74) *Attorney, Agent, or Firm* — RatnerPrestia

(57) ABSTRACT

A sol includes metal oxide nanoparticles dispersed in an aqueous liquid, and further includes stabilizer ions. The metal oxide particles include one or more metals selected from a first group consisting of cerium, zirconium, iron, manganese and titanium, and one or more metals selected from a second group consisting of platinum, palladium, rhodium, ruthenium, iridium and osmium. The sols can be used to deposit catalytic coatings onto catalyst substrates, including substrates with narrow channels (i.e. channels with a diameter of less than 500 μm).

13 Claims, No Drawings

METAL OXIDE SOLS

This application is the U.S. National Phase application of PCT International Application No. PCT/GB2005/002382, filed Jun. 17, 2005, and claims priority of British Patent Application No. 0413767.5, filed Jun. 21, 2004.

FIELD OF THE INVENTION

The present invention relates to metal oxide sols. The invention further relates to methods of coating catalyst substrates using the metal oxide sols.

BACKGROUND OF THE INVENTION

Platinum group metals (platinum, palladium, rhodium, iridium, ruthenium and osmium) are commonly used in catalytic applications. The catalytic reactions take place at the surface of the metal, so it is usual to maximise the surface area of the metal by dispersing small particles of the metal on the surface of a support material. The support material is often an oxide material, and may be a functional oxide material that alters the catalytic activity of the metal by a metal-support interaction (MSI). The metal may be deposited onto the support material by techniques wherein a metal salt is contacted with the support material so that a catalyst precursor is adsorbed onto the support. The support material is heated to a high temperature to decompose the precursor to the catalytically active form of the metal.

For many applications the catalyst is deposited onto a flow-through substrate such as a monolith, foam, static mixer or heat exchanger unit. It is possible to deposit a support material onto the substrate and then subsequently deposit a platinum group metal onto the support material. Alternatively, the platinum group metal may be deposited onto the support material and then the catalysed support material may be deposited onto the substrate.

SUMMARY OF THE INVENTION

The present inventors have sought to provide a method of coating a catalyst, (comprising a platinum group metal and a functional metal oxide) onto a substrate, wherein the method is suitable for coating substrates with narrow channels (less than 500 μm). The inventors have developed sols that can be used to deposit catalytic coatings onto substrates. A sol is a colloidal dispersion of solid particles in a liquid. The sols of the present invention are stable and can be stored for several months before they are used to coat substrates. The sols of the invention can be contrasted with "sols" produced during sol-gel processes that are often used to prepare catalysts. In a sol-gel process, the aim is not to produce a stable sol that can be stored and subsequently used, instead the sol is produced and further transformed to provide a gel, which is further transformed to provide a solid.

The present invention provides a sol comprising metal oxide nanoparticles dispersed in an aqueous liquid, wherein each metal oxide nanoparticle comprises one or more metals selected from a first group consisting of cerium, zirconium, iron, manganese and titanium, and one or more metals selected from a second group consisting of platinum, palladium, rhodium, ruthenium, iridium and osmium, wherein the one or more metals from the first group are intimately mixed with the one or more metals from the second group, and wherein the sol further comprises stabiliser ions.

Each metal oxide nanoparticle comprises one or more functional metal oxide materials: ceria, zirconia, iron oxide, manganese oxide and/or titania. Each nanoparticle further comprises one or more platinum group metals, which may be present as the oxide or as the metal. The functional metal oxide(s) and the platinum group metal(s) are in intimate contact and are intimately mixed, which is believed to provide good metal support interaction.

DETAILED DESCRIPTION OF THE INVENTION

It has become desirable to decrease the dimensions of the channels in flow-through substrates. Smaller channels can increase the internal surface area of a substrate for a given substrate size, or can maintain the surface area whilst decreasing the substrate size. However, coating catalyst materials onto the walls of small channels is challenging and the size of the channels is effectively limited by the size of the support materials.

WO 00/27527 discloses a method of forming a supported catalyst wherein ceria nanoparticles are dispersed in water with zirconium and platinum salts. The platinum-ceria-zirconia catalyst is subsequently dispersed on γ-alumina support material. The authors state that the platinum is dispersed on the surface of ceria-zirconia nanocrystals. By contrast, in the nanoparticles of the sols of the present invention, the one or more metals of the first group are intimately mixed with the one or more metals from the second group. The term "intimately mixed" means that the one or more metals of the first group and the one or more metals from the second group are dispersed through the bulk of the nanoparticles. This can be confirmed by techniques such as high-resolution transmission microscopy in conjunction with x-ray microanalysis.

Preferably the one or more metals selected from the first group is/are cerium or cerium and zirconium, and the one or more metals selected from the second group is/are platinum and/or rhodium, most preferably platinum.

The metal oxide nanoparticles may comprise metal oxides other than oxides of the metals selected from the first and second groups. The additional metal oxides may improve the adhesion of the nanoparticles to a substrate, or may reduce the amount of expensive components in the nanoparticles without significant reduction in catalytic efficacy. A preferred additional metal oxide is alumina. Preferably, all the metal oxides in the nanoparticles are intimately mixed.

The molar ratio of the one or more metals selected from the first group to the one or more metals selected from the second group is suitably at least 1, preferably at least 5 and most preferably at least 10, Having a ratio of less than 1 provides a greater proportion of the platinum group metal(s) and is uneconomical and unlikely to improve catalytic efficacy.

The molar ratio of metal:stabiliser ions is suitably at least 0.7, and preferably at least 1. In this ratio the "metal" is the number of moles of metal ions in the oxide nanoparticles, including metals from the first group, the second group and any additional metals. The low level of stabiliser ions means that the sols are advantageously used to prepare catalysed support materials. The stabiliser ions are easily removed by low temperature treatment (and thus the nature of the catalyst is unaffected), and the environmental impact of stabiliser removal is minimised.

The metal oxide nanoparticles suitably have an average diameter of less than 10 nm, and preferably have an average diameter of less than 5 nm. The sols can be advantageously used to coat substrates having narrow channels (diameter less than 500 μm).

The stabiliser ions are suitably anionic, and are preferably the anions of mineral acids, e.g. nitrate ions, or the anions of organic acids with a pKa (relative to water) of less than 8, e.g. acetate ions.

The concentration of metal oxide nanoparticles in the sol is suitably at least 50 g/l, preferably at least 100 g/l and most preferably at least 200 g/l.

The invention further provides a process for preparing sols according to the invention, comprising steps of:
a) preparing an aqueous solution of metal salts wherein the metal salts comprise one or more metals selected from a first group consisting of cerium, zirconium, iron, manganese and titanium, and one or more metals selected from a second group consisting of platinum, palladium, rhodium, ruthenium, iridium and osmium;
b) adding the aqueous solution of metal salts to a base to form a hydroxide precipitate; and
c) adding an acid to the hydroxide precipitate to peptise the precipitate and form a sol stabilised by the conjugate base of the acid.

Preferably the metal salts are metal nitrates. The aqueous solution is suitably mixed and is added to a base such as ammonia, providing a hydroxide precipitate. The precipitate is suitably filtered and washed thoroughly to remove any remaining salts. The hydroxide precipitate is then peptised by an acid that provides the stabiliser ion. If the stabiliser ion is the anion of a mineral acid, then the peptising agent is the mineral acid.

The invention further provides a method wherein the sols of the invention are used to coat a catalyst substrate. The substrate may be a standard catalyst substrate such as a monolith, a foam, a filter or a catalyst pellet and the substrate may have been pre-coated with a high surface area support material such as alumina. However, in a preferred embodiment of the invention the substrate is any catalyst substrate having narrow channels for the transport of reactants and products, i.e. channels having a diameter of less than 500 µm and preferably channels having a diameter of less than 200 µm. An example of such a substrate is a so-called microreactor comprising etched plates. The sols of the invention are advantageously used to coat substrates having very fine channels because the metal oxide nanoparticles are small (suitably having an average diameter of less than 10 nm) and there is no difficulty passing the nanoparticles through the channels and depositing them onto the channel walls. By contrast, traditional washcoating technology cannot be used to coat catalyst substrates wherein the channels are narrow because the washcoat slurries will block the channels.

In another preferred embodiment, the sols of the invention are used to coat a catalyst substrate, wherein the substrate is a catalyst pellet. The inventors have found that the sols of the present invention can be used to prepare catalysed pellets wherein the catalyst penetrates through the pellet and is firmly bound to the pellet.

In a first embodiment of the method, the sol is directly coated onto a substrate by contacting the sol with the substrate. This method is appropriate for coating all catalyst substrates, including catalyst substrates that have narrow (diameter less than 500 µm) channels and including catalyst pellets. Preferably the viscosity of the sol is increased by adding a viscosity modifier such as hydroxyethylcellulose to the sol. The sol may be applied to a substrate with channels by using a vacuum to draw the sol through the channels of the substrate. After the sol is contacted with the substrate, the substrate is dried (e.g. at 130° C.) and calcined (e.g. at 500° C.).

In a second method embodiment of the method, the sol is initially coated onto a support material such as a metal oxide material or a carbon material to form a catalysed support material, and then the catalysed support material is deposited onto a catalyst substrate. This method is unlikely to be appropriate for coating catalyst substrates having fine channels. Suitable metal oxide materials are likely to have a surface area greater than 50 $m^2$/g and are preferably chosen from the group consisting of oxides and mixed oxides of aluminium, silicon, magnesium, titanium, cerium, zirconium, iron and tin. Suitable carbon materials include carbon black, graphite and activated charcoal.

To prepare the supported catalyst material, an impregnation method wherein the sol is contacted with a support material in powder form may be used. Suitably the powder and the sol are mixed, filtered and dried at a temperature of that is suitably not more than 200° C., preferably about 100° C. Alternatively, an absorption method wherein the sol is added to an aqueous slurry comprising particles of the support material may be used. Suitably the slurry and the sol are mixed, filtered and dried at a temperature of suitably not more than 200° C., preferably about 100° C. The supported catalyst material can be deposited onto a catalyst substrate using techniques that are well known to the person skilled in the art.

EXAMPLES

The invention will now be described by reference to examples which are intended to be illustrative and not limiting of the invention.

Example 1

Sol Comprising Pt/$CeO_2$/$ZrO_2$/$Al_2O_3$ Stabilised by Nitrate Ions

Platinum (IV) nitrate (from Johnson Matthey (UK), 3.05 g, 16.37% Pt) was added to an aqueous solution comprising cerium (IV) nitrate (45 ml containing 18.8 g/0.109 mol $CeO_2$ equivalent), zirconium nitrate (16.3 ml, containing 4.5 g/0.037 mol $ZrO_2$ equivalent) and aluminium nitrate (9.04 g/0.024 mol). The solution was added to ammonia (200 ml 4M), and a precipitate formed. The precipitate was recovered by filtration and washed with water until the conductivity of the precipitate was less than 100 µS indicating that the majority of the residual nitrate salts had been removed. The filter cake was peptised with nitric acid (1M) providing a sol with an oxide content of 100 g$l^{-1}$. The ratio of metal (platinum, cerium, zirconium and aluminium) to nitrate ion in the sol was 1:1. The ratio of platinum:cerium:zirconium:aluminium was 1:42.6:14.5:9.4.

Example 2

Sol Comprising Pt/Rh/$CeO_2$/$ZrO_2$/$Al_2O_3$ Stabilised by Nitrate Ions

Platinum (IV) nitrate (from Johnson Matthey (UK), 3.05 g, 16.37% Pt) and rhodium nitrate (from Johnson Matthey (UK), 1.79 g, 13.93% Rh) were added to an aqueous solution comprising cerium (IV) nitrate (45 ml containing 18.6 g/0.108 mol $CeO_2$ equivalent), zirconium nitrate (16.2 ml, containing 4.4 g/0.036 mol $ZrO_2$ equivalent) and aluminium nitrate (9.04 g/0.024 mol). The solution was added to ammonia (200 ml 4M), and a precipitate formed. The precipitate was recovered by filtration and washed with water until the conductivity of the precipitate was less than 100 µS indicating that the majority of the residual nitrate salts had been removed. The filter cake was peptised with nitric acid (1M) providing a sol oxide content of 200 gl$^{-1}$. The ratio of metal (platinum, rhodium, cerium, zirconium and aluminium) to nitrate ion in the sol was 1:1. The ratio of platinum:rhodium:cerium:zirconium:aluminium 1:1:42.4:14.1:9.4.

Example 3

Sol Comprising Pt/CeO$_2$/ZrO$_2$ Stabilised by Nitrate Ions

Platinum (IV) nitrate (from Johnson Matthey (UK), 1.53 g, 16.37% Pt) was added to an aqueous solution comprising cerium (IV) nitrate (28 ml containing 10.0 g/0.058 mol CeO$_2$ equivalent) and zirconium nitrate (8.6 ml, containing 2.4 g/0.019 mol ZrO$_2$ equivalent). The solution was added to ammonia (100 ml 4M), and a precipitate formed. The precipitate was recovered by filtration and washed with water until the conductivity of the precipitate was less than 100 µS indicating that the majority of the residual nitrate salts had been removed. The filter cake was peptised with nitric acid (1M) providing a sol oxide content of 90 gl$^{-1}$. The ratio of metal (platinum, cerium and zirconium) to nitrate ion in the sol was 1:1. The ratio of platinum:cerium:zirconium was 1:45.3:14.8.

Example 4

Sol Comprising Rh/CeO$_2$/ZrO$_2$ Stabilised by Nitrate Ions

A solution containing rhodium nitrate (from Johnson Matthey (UK), 3.59 g, 13.93% Rh), cerium (IV) nitrate (47.8 ml containing 19.8 g/0.11 mol CeO$_2$ equivalent) and zirconium nitrate (12.7 ml, containing 3.5 g/0.03 mol ZrO$_2$ equivalent) in 200 ml water was prepared. The aqueous solution was added dropwise and with stirring to 4M ammonia solution (200 ml). A precipitate formed and was recovered by filtration. The precipitate was washed with water to remove residual nitrate salts. The filter cake was peptised by adding nitric acid (1M) and heating and stirring at 80° C. for 2-3 hours. This provided a sol oxide content of 197 gl$^{-1}$. The ratio of metal (rhodium, cerium and zirconium) to nitrate ion in the sol was 2:1.

Example 5

Sol Comprising Rh/CeO$_2$/ZrO$_2$/Al$_2$O Stabilised by Nitrate Ions

A solution containing rhodium nitrate (from Johnson Matthey (UK), 3.59 g, 13.93% Rh), cerium (IV) nitrate (47.8 ml containing 19.8 g/0.11 mol CeO$_2$ equivalent), zirconium nitrate (12.7 ml, containing 3.5 g/0.03 mol ZrO$_2$ equivalent) and aluminium nitrate (9.19 g, containing 0.0245 mol) in 200 ml water was prepared. The aqueous solution was added dropwise and with stirring to 4M ammonia solution (200 ml). A precipitate formed and was recovered by filtration. The precipitate was washed with water to remove residual nitrate salts. The filter cake was peptised by adding nitric acid (1M) and heating and stirring at 80° C. for 2-3 hours. The ratio of metal (rhodium, cerium, zirconium and aluminium) to nitrate ion in the sol was 5:3.

Example 6

Coating a Microreactor

The sol made according to example 1 was thickened by adjusting the pH to 3 from the as prepared value of 0.9 with 1M ammonia and adding 0.5 wt % Natrosol™ hydroxyethylcellulose. The Natrosol dissolved over about 3 hours to yield a thick rubbery solution. The sol was coated onto a microreactor containing etched silicon plates and having channel dimensions of less than 200 µm. The thickened sol was drawn through the microreactor by a vacuum, depositing a layer of the sol on the inside of the microreactor. The reactor was dried at 130° C. and calcined at 500° C.

Example 7

Coating Catalyst Pellets

α-alumina catalyst pellets were submerged in the sol made according to example 4 for five minutes. The pellets were removed from the sol, and excess sol was removed from the pellets using compressed air. The pellets were dried at 120° C. for 8 hours and calcined at 500° C. for 2 hours. This process was repeated up to three times.

After just one coating step (submerging in the sol, drying, calcining), the weight of a pellet increased by 3.9%; after two coating steps the weight increase was 7.7% and after three coating steps the weight increase was 10.9%.

Example 7

Coating Catalyst Pellets

α-alumina catalyst pellets were submerged in the sol made according to example 5 for five minutes. The pellets were removed from the sol, and excess sol was removed from the pellets using compressed air. The pellets were dried at 120° C. for 8 hours and calcined at 500° C. for 2 hours. After this process, the average weight increase of a pellet was 3.7%.

The invention claimed is:

1. A sol comprising metal oxide nanoparticles dispersed in an aqueous liquid, wherein each metal oxide nanoparticle comprises one or more metals selected from a first group consisting of cerium, zirconium, iron, manganese and titanium, and one or more metals selected from a second group consisting of platinum, palladium, rhodium, ruthenium, iridium and osmium, wherein the one or more metals from the first group are intimately mixed with the one or more metals from the second group, the sol further comprises stabilizer ions wherein the stabilizer ions are anions of mineral acids or anions of organic acids with a pKa (relative to water) of less than 8, and the concentration of metal oxide nanoparticles in the sol is at least 50 g/l.

2. A sol according to claim 1, wherein the one or more metals selected from the first group is cerium, and the one or more metals selected from the second group is platinum.

3. A sol according to claim 1, wherein the metal oxide nanoparticles further comprise alumina and the alumina is intimately mixed with the one or more metals from the first group and the one or more metals from the second group.

4. A sol according to claim 1, wherein the molar ratio of the one or more metals selected from the first group to the one or more metals selected from the second group is at least 1.

5. A sol according to claim 4, wherein the molar ratio of the one or more metals selected from the first group to the one or more metals selected from the second group is at least 10.

6. A sol according to claim 1, wherein the molar ratio of metal:stabilizer ions is at least 0.7.

7. A sol according to claim 1, wherein the metal oxide nanoparticles have an average diameter of less than 10 nm.

8. A sol according to claim 1, wherein the one or more metals selected from the first group are cerium and zirconium, and the one or more metals selected from the second group is platinum.

9. A sol according to claim 1, wherein the one or more metals selected from the first group is cerium, and the one or more metals selected from the second group is rhodium.

10. A sol according to claim 1, wherein the one or more metals selected from the first group are cerium and zirconium, and the one or more metals selected from the second group is rhodium.

11. A sol according to claim 1, wherein the one or more metals selected from the first group are cerium and zirconium, and the one or more metals selected from the second group are platinum and rhodium.

12. A sol according to claim 1, wherein the stabilizer ions are the anions of mineral acids, and the anions of mineral acids comprise nitrate anions.

13. A sol according to claim 1, wherein the stabilizer ions are the anions of organic acids with a pKa (relative to water) of less than 8.

* * * * *